United States Patent
Wang

(10) Patent No.: US 9,923,476 B2
(45) Date of Patent: Mar. 20, 2018

(54) SWITCHING POWER SUPPLY AND METHOD FOR CONTROLLING SWITCHING POWER SUPPLY

(71) Applicant: ZTE CORPORATION, Shenzhen, Guangdong Province (CN)

(72) Inventor: Linguo Wang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 15/313,974

(22) PCT Filed: Sep. 9, 2014

(86) PCT No.: PCT/CN2014/086116
§ 371 (c)(1),
(2) Date: Nov. 25, 2016

(87) PCT Pub. No.: WO2015/180290
PCT Pub. Date: Dec. 3, 2015

(65) Prior Publication Data
US 2017/0141691 A1    May 18, 2017

(30) Foreign Application Priority Data
May 26, 2014   (CN) .......................... 2014 1 0225330

(51) Int. Cl.
*H02M 3/335* (2006.01)

(52) U.S. Cl.
CPC ... *H02M 3/33592* (2013.01); *H02M 3/33523* (2013.01); *H02M 3/33576* (2013.01); *H02M 3/33584* (2013.01)

(58) Field of Classification Search
CPC .................................................. H02M 3/335
See application file for complete search history.

(56) References Cited

U.S. PATENT DOCUMENTS

| | | | |
|---|---|---|---|
| 4,686,615 A | 8/1987 | Ferguson | |
| 4,761,722 A | 8/1988 | Pruitt | |

(Continued)

FOREIGN PATENT DOCUMENTS

| | | | |
|---|---|---|---|
| CN | 1434560 A | 8/2003 | |
| CN | 101350557 A | 1/2009 | |

(Continued)

*Primary Examiner* — Jue Zhang
*Assistant Examiner* — Trinh Dang
(74) *Attorney, Agent, or Firm* — Ling Wu; Stephen Yang; Ling and Yang Intellectual Property

(57) ABSTRACT

A switching power supply and a method for controlling the switching power supply, the switching power supply includes: an input power supply, a front-stage circuit which includes a first inductor and at least two switch devices, and a post-stage isolated circuit which includes a primary-side switch circuit, a transformer and a secondary-side rectification circuit. One end of the first switch device is connected to a positive electrode of the input power supply, one end of the second switch device and an input-end of the first inductor are jointly connected to another end of the first switch device, another end of the second switch device is connected to a negative electrode of the input power supply, an output-end of the first inductor is connected to the primary-side switch circuit of post-stage isolated circuit, and another end of the primary-side switch circuit is connected to another end of the second switch device.

10 Claims, 5 Drawing Sheets

(56) References Cited

U.S. PATENT DOCUMENTS

| | | | |
|---|---|---|---|
| 5,138,249 A | | 8/1992 | Capel |
| 5,652,479 A | * | 7/1997 | LoCascio ............ H05B 41/2855 |
| | | | 315/209 R |
| 5,822,201 A | * | 10/1998 | Kijima .............. H02M 7/53835 |
| | | | 315/DIG. 5 |
| 6,137,698 A | * | 10/2000 | Yukawa ............ H02M 3/33576 |
| | | | 363/127 |
| 2009/0122578 A1 | | 5/2009 | Beltran |
| 2009/0129123 A1 | * | 5/2009 | Taurand ............ H02M 3/33576 |
| | | | 363/17 |
| 2011/0025289 A1 | | 2/2011 | Wang et al. |
| 2012/0092903 A1 | | 4/2012 | Nania et al. |
| 2014/0009981 A1 | | 1/2014 | Charles Knill et al. |
| 2014/0103860 A1 | * | 4/2014 | Kominami .............. H02M 1/32 |
| | | | 320/103 |

FOREIGN PATENT DOCUMENTS

| | | |
|---|---|---|
| CN | 101814827 A | 8/2010 |
| DE | 2941009 A1 | 4/1981 |
| DE | 4120147 A1 | 1/1993 |
| JP | 2007274852 A | 10/2007 |
| JP | 2013099069 A | 5/2013 |

\* cited by examiner

SWITCHING POWER SUPPLY AND METHOD FOR CONTROLLING SWITCHING POWER SUPPLY

TECHNICAL FIELD

The present document relates to the field of electronic technique, and especially, to a switching power supply and a method for controlling the switching power supply.

BACKGROUND OF THE RELATED ART

In the power supply architecture of the existing communication systems, due to the consideration of security and efficiency, an isolated Intermediate Bus Architecture IBA is extensively applied. In the architecture, the input voltage of the system is firstly converted into an intermediate voltage through an isolated Intermediate Bus Converter IBC, and then the intermediate voltage is converted into a voltage required by a load circuit through multiple post-stage non-isolated power supplies.

In order to adapt to different systems, an intermediate bus power supply is always required to adapt to a wider input voltage, in the case of processing a certain power, a power device thereof is required to simultaneously meet a high voltage stress, and a large current stress during low voltage input, therefore it is difficult to optimize the device selection. With regard to a common input voltage range 36~75V of the communication systems, the power device is required to select a margin at least twice the rated power. Meanwhile, the power device as the bus power supply is required to process all power demands of one system, thus efficiency is also a foremost index, but selecting a device with a larger power margin always leads to lower efficiency and enlarges a power supply volume, which affects a power density index.

In the related art as shown in FIG. 1, a traditional switching power supply structure with voltage transformation is implemented with the Pulse Width Modulation PWM technology. When the input voltage range is wider, the pulse width duty ratio is varied greatly, so that energy storage elements such as an inductance and so on are required to constantly store and release more energy in the voltage conversion process, which causing that both volume and loss of the energy storage elements increase. The wide input voltage range also makes the power device need to simultaneously tolerate the high voltage stress during high voltage input and the large current stress during low voltage input, therefore, it is required to select a power device with a power much greater than the actual output power, which results in that both volume and loss of the power device increase. Therefore, the traditional switching power supply structure will lead to a problem of efficiency reduction and power density decline in the wide input voltage range.

In order to solve the problem of stress margin increase of the power device brought by the wide range of input voltage, a common scheme dealing with that is a two-stage structure as shown in FIG. 2, a non-isolated voltage stabilizing front-stage circuit and a transformer isolated post-stage circuit are included, so that the post stage is only required to deal with the fixed input voltage by the front-stage voltage stabilizing circuit, which avoids the stress problem brought by the wide input voltage range. However, the scheme does not solve the problem of larger variation of the front-stage duty ratio brought by the wide input voltage range. With regard to the buck switching power supply, the efficiency and the volume of energy storage elements can be optimal when the duty ratio is maximum, which correspondingly in such structure when the input voltage is lowest such as 36V but not the rated operational voltage. Therefore, both efficiency and volume cannot be optimal when the system is at the rated operational voltage such as 48V.

In order to deal with the problem of larger variation of the duty ratio brought by the wide range of input voltage, in the non-isolated switching power supply, the output non-inverting Buck-Boost topology as shown in FIG. 3 is usually adopted to effectively solve the problem, and it is widely applied to battery-powered terminal devices without isolation requirements. In the topology, the output voltage may be set as an intermediate value. When the input voltage is higher than a set value of the output value, the circuit works in a Buck mode. When the input voltage is lower than the set value of the output value, the circuit works in a Boost mode. Therefore, the duty ratio variation range may be halved.

The related art shown in FIG. 4 is a schematic diagram of the Buck-Boost topology added with an isolation function, an isolation part thereof is implemented by a traditional buck bridge circuit or other resonance circuits such as Logical Link Control circuit and so on. The circuit may achieve the advantage of narrow duty ratio variation range of the non-isolated Buck-Boost mentioned above, and meanwhile, the post-stage isolated circuit is also not required to deal with the stress problem of the power device brought by the wide range of input voltage, which is an application with higher efficiency in the related art.

But the technology is substantially equivalent to a composition of Buck+Boost+bridge isolated three-stage circuits, and a main application thereof is an isolated post stage with multiple different transformation ratios to form the division-ratio power supply architecture with various voltage outputs, and it employs relatively more power devices, which causes that the volume increase is greater when the power devices are used as a single power supply, and the power density is not high.

Therefore, the post-stage bridge circuit only plays a role of isolation or buck in the related art, but brings the problem of wide duty ratio variation range and low efficiency or many power devices and lager volume.

SUMMARY

The embodiments of the present document provide a switching power supply and a method for controlling the switching power supply, to solve the problem of wide duty ratio variation range and low efficiency or many power devices and lager volume brought as the post-stage bridge circuit only plays a role of isolation or buck in the related art.

In order to solve the above technical problem, on the one hand, the embodiment of the present document provides a switching power supply, which includes: an input power supply, a front-stage circuit and a post-stage isolated circuit; herein, the front-stage circuit includes: a first inductor and at least two switch devices—a first switch device and a second switch device; and the post-stage isolated circuit includes: a primary-side switch circuit, a transformer and a secondary-side rectification circuit;

herein, one end of the first switch device is connected to a positive electrode of the input power supply, one end of the second switch device and an input end of the first inductor are jointly connected to another end of the first switch device, another end of the second switch device is connected to a negative electrode of the input power supply, an output end of the first inductor is connected to the primary-side switch circuit of the post-stage isolated circuit, and another end of the primary-side switch circuit is connected to another end of the second switch device.

Alternatively, the primary-side switch circuit includes: at least two switch devices, herein, switched-on of one switch device or switched-on of a combination switch containing the one switch device makes the first inductor connected to a charging state, switched-off of another switch device or switched-off of a combination switch containing another switch device makes energy in the first inductor transferred to the secondary-side rectification circuit via the transformer.

Alternatively, said switched-on of one switch device or switched-on of a combination switch containing the one switch device makes the first inductor connected to a charging state, in order to connect the output end of the first inductor to a negative end of the input power supply, or to connect the output end of the first inductor to the negative end of the input power supply through a primary-side winding.

Alternatively, in a case that a transformer primary side includes one winding, and the primary-side switch circuit includes four switch devices—a third switch device, a fourth switch device, a fifth switch device and a sixth switch device, one end of the third switch device is connected to the output end of the first inductor, another end of the third switch device is connected to the fourth switch device and a current inflow end of the transformer primary side, another end of the fourth switch device and one end of the fifth switch device and the negative electrode of the input power supply are connected jointly together, another end of the fifth switch device and one end of the sixth switch device and a current outflow end of the transformer primary side are connected jointly together, and another end of the sixth switch device is connected to the output end of the first inductor.

Alternatively, in a case that a transformer primary side includes one winding, and the primary-side switch circuit includes two switch devices—a third switch device and a fourth switch device, and a second inductor, one end of the third switch device is connected to the output end of the first inductor, another end of the third switch device is connected to the output end of the first inductor via the fourth switch device and the second inductor, a junction of the third switch device and the fourth switch device is connected to the negative electrode of the input power supply; the output end of the first inductor is connected to a current inflow end of the transformer primary side, and a current outflow end of the transformer primary side is connected to a junction of the second inductor and the fourth switch device.

Alternatively, in a case that a transformer primary side includes two windings, and the primary-side switch circuit includes two switch devices—a third switch device and a fourth switch device, one end of the third switch device is connected to a current inflow end of a first winding of the transformer primary side, one end of the fourth switch device is connected to a current outflow end of a second winding of the transformer primary side, a current outflow end of the first winding and a current inflow end of the second winding are jointly connected to the output end of the first inductor, and another end of the third switch device and another end of the fourth switch device are jointly connected to the negative end of the input power supply.

Alternatively, in a case that a transformer secondary side includes one winding, and the secondary-side rectification circuit includes four switch devices—a seventh switch device, an eighth switch device, a ninth switch device and a tenth switch device, a dotted end of the transformer secondary side corresponding to the current inflow end of the transformer primary side and one end of the seventh switch device and one end of the eighth switch device are connected jointly together, another end of the seventh switch device is connected to another end of the eighth switch device via the ninth switch device and the tenth switch device, a junction of the ninth switch device and the tenth switch device is jointly connected to another end of the dotted terminal of the transformer secondary side, and another end of the seventh switch device and another end of the eighth switch device serve as an output end of the secondary-side rectification circuit.

Alternatively, in a case that a transformer secondary side includes two windings, and the secondary-side rectification circuit includes two switch devices—a seventh switch device and an eighth switch device, one end of the seventh switch device is connected to a current inflow end of a first winding of the transformer secondary side, one end of the eighth switch device is connected to a current outflow end of a second winding of the transformer secondary side, a current outflow end of the first winding and a current inflow end of the second winding jointly serve as one output end of the secondary-side rectification circuit, another end of the seventh switch device and another end of the eighth switch device are connected and jointly serve as another output end of the secondary-side rectification circuit, so that the one output end of the secondary-side rectification circuit and the another output end form an output end of the secondary-side rectification circuit.

Alternatively, the switch devices at least include one of the following: a triode, an MOS transistor and a diode.

On the other hand, the embodiment of the present document further provides a method for controlling a switching power supply, which is used for controlling the switch circuit mentioned in any item above, and includes: in a case of supplying an input voltage, controlling switch devices of the primary-side switch circuit, so that switched-on of a combination of at least one switch device makes the first inductor connected to the charging state, and switched-off of a combination of at least one switch device makes energy in the first inductor transferred to the secondary-side rectification circuit via the transformer; and the secondary-side rectification circuit performing rectification on the energy transferred by the primary-side switch circuit to form output voltage of the switching power supply.

Alternatively, when the switch circuit works in a boost state, the front-stage circuit works in a shoot-through state to implement a boost function; and when the switch circuit works in a buck state, the post-stage isolated circuit works in the shoot-through state to implement a buck function.

The structure of the front-stage circuit of the embodiment of the present document is simple, both the buck-boost circuit and the isolated circuit are designed in the switching power supply, and the number of circuit stages of the switching power supply jointly formed with the post-stage isolated circuit is smaller, thus the volume is smaller, which solves the problem of wide duty ratio variation range and low efficiency or many power devices and lager volume brought as the post-stage bridge circuit only plays a role of isolation or buck in the related art.

PREFERRED EMBODIMENTS

In order to solve the problem of wide duty ratio variation range and low efficiency or many power devices and lager volume brought as the post-stage bridge circuit only plays a role of isolation or buck in the related art, the embodiments of the present document provide a switching power supply and a method for controlling the switching power supply. The embodiments of the present document will be described in detail in combination with the accompanying drawings below. The embodiments of the present document and the characteristics in the embodiments can be arbitrarily combined with each other in the case of no conflict.

Figure 5:
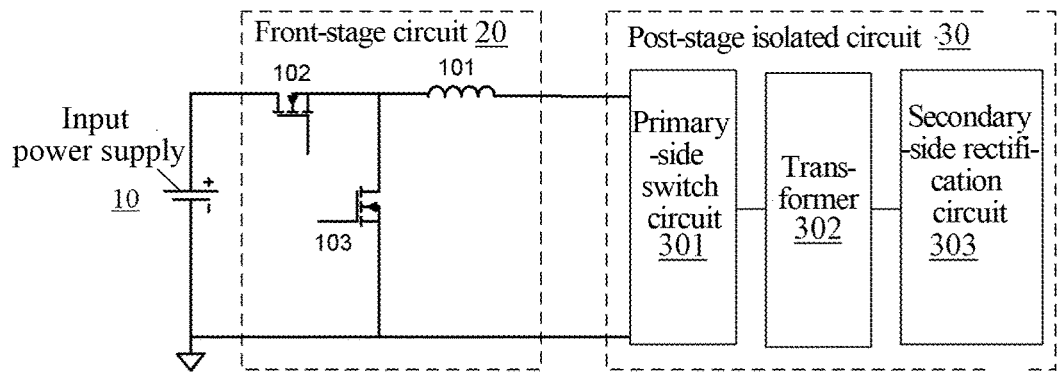
FIG. 5 is a schematic diagram of a structure of a switching power supply in an embodiment of the present document.

The embodiment of the present document provides a switching power supply, and a structure of the switching power supply is as shown in FIG. 5, which includes:

an input power supply 10, a front-stage circuit 20 and a post-stage isolated circuit 30.

Herein, the front-stage circuit includes a first inductor 101 and at least two switch devices.

The post-stage isolated circuit 30 includes a primary-side switch circuit 301, a transformer 302 and a secondary-side rectification circuit 303.

Herein, one end of the first switch device 102 is connected to a positive electrode of the input power supply, one end of the second switch device 103 and an input end of the first inductor are jointly connected to the other end of the first switch device, the other end of the second switch device is connected to a negative electrode of the input power supply, an output end of the first inductor is connected to the primary-side switch circuit of the post-stage isolated circuit, and the other end of the primary-side switch circuit is connected to the other end of the second switch device.

The structure of the front-stage circuit of the embodiment of the present document is simple, both the buck-boost circuit and the isolated circuit are designed in the switching power supply, and the number of circuit stages of the switching power supply jointly formed with the post-stage isolated circuit is smaller, thus the volume is smaller, which solves the problem of wide duty ratio variation range and low efficiency or many power devices and lager volume brought as the post-stage bridge circuit only plays a role of isolation or buck in the related art.

In the design, the primary-side switch circuit includes at least two switch devices. Herein, in the two switch devices, turn-on of one switch device or turn-on of a combination switch containing one switch device makes the first inductor connected to a charging state, turn-off of the other switch device or turn-off of a combination switch containing the other switch device makes energy in the first inductor transferred to the secondary-side rectification circuit via the transformer. The secondary-side rectification circuit includes at least two switch devices used for performing rectification on the energy transferred by the primary-side switch circuit to form an output voltage of the switching power supply. A person skilled in the art may employ the rectification circuit in the related art, and may also make a design based on the achieved effect above. In the design process, different circuits may be designed according to different switch devices, and the switch devices may be a triode, an MOS transistor and a diode and so on. In the implementation process of the circuit, the turn-on of one switch device or the turn-on of a combination switch containing one switch device making the first inductor connected to a charging state may include various on-off states. In order to make a connection state accurate, the turn-on of the above switch is required to be able to connect the output end of the first inductor to a negative terminal of the input power supply, or to connect the output end of the first inductor to the negative terminal of the input power supply through a primary-side winding.

During the specific implementation for the above design, it is required to perform circuit layout on the transformer, primary-side switch circuit and secondary-side rectification circuit according to the design requirements. According to different requirements, circuits in different conditions will be described respectively below.

Based on a difference of the number of windings of the transformer primary side and a difference of the number of switch devices of the primary-side switch circuit, various circuits may be set, but based on the consideration of duty ratio variation range, efficiency, power and volume and so on, the embodiment provides three preferred cases to make a description.

(1) In a case that the transformer primary side includes one winding, and the primary-side switch circuit includes four switch devices, one end of the third switch device is connected to the output end of the first inductor, the other end of the third switch device is connected to the fourth switch device and a current inflow end of the transformer primary side, the other end of the fourth switch device and one end of the fifth switch device and the negative electrode of the input power supply are connected jointly together, the other end of the fifth switch device and one end of the sixth switch device and a current outflow end of the transformer primary side are connected jointly together, and the other end of the sixth switch device is connected to the output end of the first inductor.

(2) In a case that the transformer primary side includes one winding, and the primary-side switch circuit includes two switch devices and a second inductor, one end of the third switch device is connected to the output end of the first inductor, the other end of the third switch device is connected to the output end of the first inductor via the fourth switch device and the second inductor, a junction of the third switch device and the fourth switch device is connected to the negative electrode of the input power supply; the output end of the first inductor is connected to a current inflow end of the transformer primary side, and a current outflow end of the transformer primary side is connected to a junction of the second inductor and the fourth switch device.

(3) In a case that the transformer primary side includes two windings, and the primary-side switch circuit includes two switch devices, one end of the third switch device is connected to a current inflow end of a first winding of the transformer primary side, one end of the fourth switch device is connected to a current outflow end of a second winding of the transformer primary side, a current outflow end of the first winding and a current inflow end of the second winding are jointly connected to the output end of the first inductor, and the other end of the third switch device and the other end of the fourth switch device are jointly connected to the negative terminal of the input power supply.

Based on a difference of the number of windings of the transformer primary-secondary side and a difference of the number of switch devices of the secondary-side switch circuit, various circuits may be set, but also based on the consideration of duty ratio variation range, efficiency, power and volume and so on, the embodiment provides two preferred cases to make a description.

(1) In a case that the transformer secondary side includes one winding, and the secondary-side rectification circuit includes four switch devices, a dotted terminal of the transformer secondary side corresponding to a current inflow end of the transformer primary side and one end of the seventh switch device and one end of the eighth switch device are connected jointly together, the other end of the seventh switch device is connected to the other end of the eighth switch device via the ninth switch device and the tenth switch device, a junction of the ninth switch device and the tenth switch device is jointly connected to the other end of the dotted terminal of the transformer secondary side, and the other end of the seventh switch device and the other end of the eighth switch device serve as an output end of the secondary-side rectification circuit.

(2) In a case that the transformer secondary side includes two windings, and the secondary-side rectification circuit includes two switch devices, one end of the seventh switch device is connected to a current inflow end of a first winding of the transformer secondary side, one end of the eighth switch device is connected to a current outflow end of a second winding of the transformer secondary side, a current outflow end of the first winding and a current inflow end of the second winding jointly serve as one output end of the secondary-side rectification circuit, the other end of the seventh switch device and the other end of the eighth switch device are connected and jointly serve as the other output end of the secondary-side rectification circuit, so that one output end of the secondary-side rectification circuit and the other output end form an output terminal of the secondary-side rectification circuit.

Three kinds of circuits in different cases of the primary side and two kinds of circuits in different cases of the secondary side have been respectively introduced above. The above circuits corresponding to the primary side and the secondary side may be designed with each other in a combinational way according to the requirements.

Figure 6:
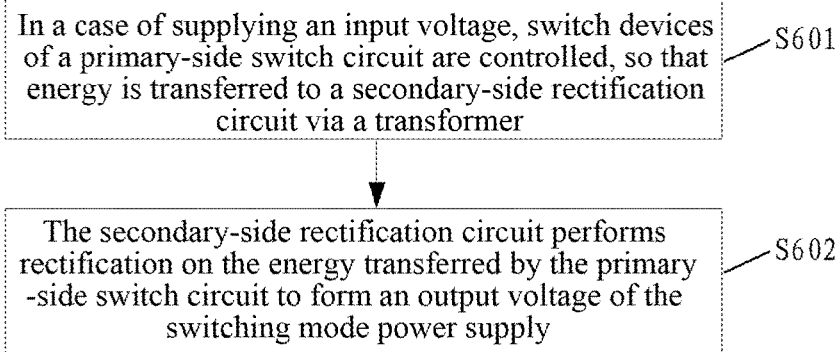
FIG. 6 is a flow chart of a method for controlling the switching power supply in an embodiment of the present document.

The embodiment of the present document also provides a method for controlling a switching power supply, which is used for controlling any of the switching power supplies provided above. A flow of the method is as shown in FIG. 6, and step S601 to step S602 are included.

In step S601, in a case of supplying an input voltage, switch devices of a primary-side switch circuit are controlled, so that turn-on of a combination of at least one switch device makes a first inductor connected to a charging state, and turn-off of a combination of at least one switch device makes energy in the first inductor transferred to a secondary-side rectification circuit via a transformer.

In step S602, the secondary-side rectification circuit performs rectification on the energy transferred by the primary-side switch circuit to form an output voltage of the switching power supply.

When the circuit works, in a case that the switch circuit works in a boost state, a front-stage circuit works in a shoot-through state to implement a boost function; and in a case that the switch circuit works in a buck state, a post-stage isolated circuit works in a shoot-through state to implement a buck function.

PREFERRED EMBODIMENTS

Figure 7:
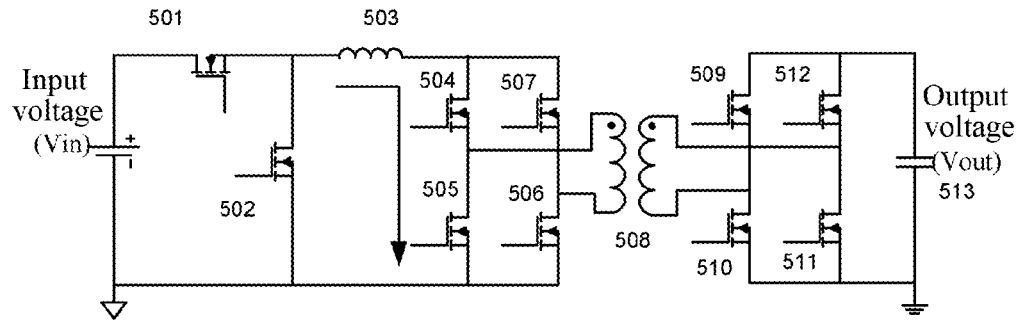
FIG. 7 is a schematic diagram of architecture of the switching power supply according to the embodiment 1 in the preferred embodiments of the present document.

As shown in FIG. 7, the circuit includes a front-stage non-isolated circuit with a buck function and a post-stage isolated circuit with a boost function, the front-stage circuit and the post-stage circuit may share one inductor, so that the whole circuit may achieve a buck-boost function to adapt to the wide range of input voltage. The implementation process thereof is to utilize a characteristic that the traditional buck isolated power supply may work bi-directionally when the synchronous rectification technology is used, reverse working may be understood as boost, and the output thereof is connected to the front-stage non-isolated BUCK circuit, thus a two-stage isolated circuit that can implement the buck-boost function may be constituted. Meanwhile, an output inductor of the BUCK circuit and an output inductor of the reversely connected bridge isolated circuit may be shared in time division. Compared with the single-stage traditional buck bridge isolated power supply scheme, it is only required to increase two Buck switch devices, and the original output inductor is transferred to the primary-side high voltage terminal, the processing current is smaller, which may greatly reduce the volume and improve the efficiency and power density while implementing the buck-boost function to adapt to the wide range of input.

The above scheme will be further described in combination with the related art and the accompanying drawings of the preferred embodiments of the present document.

Figure 1:
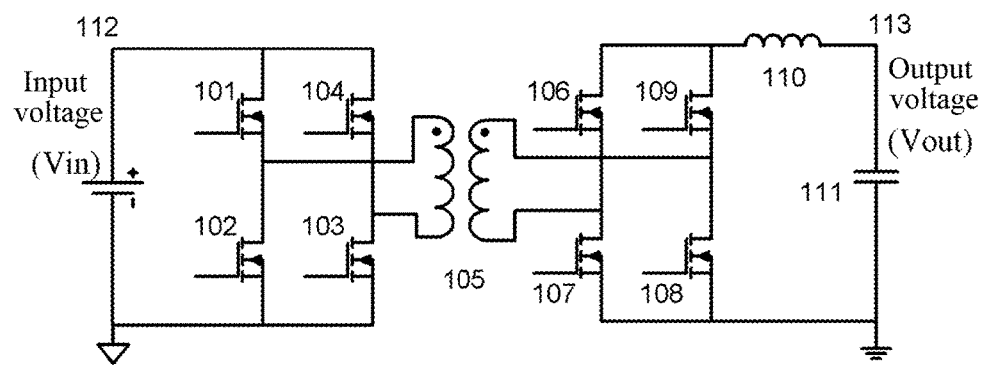
FIG. 1 is a schematic diagram of a structure of a common isolated power supply in the related art.

FIG. 1 is a typical structure of an isolated switching power supply in the related art. Through an alternate switched-on of the bridge circuit switch devices 101/103 and 102/104, the input voltage is modulated to an alternating signal with certain pulse width, and the alternating signal is transferred to the secondary side via the transformer isolation, and then goes through a rectification circuit composed of 107~109 and a lowpass filtering circuit composed of an output inductor 110 and a capacitor 111, and the final direct-current output voltage is obtained. A transformation ratio of the output voltage and the input voltage is decided by a pulse width duty ratio of the bridge circuit and a primary-secondary side transformation ratio of the transformer. When the input voltage range is wider, variation of the pulse width duty ratio of the bridge circuit is also greater. When the bridge circuit is switched on, the input power supply transfers energy to the output via the transformer, the inductor 110 starts to store energy; and when the bridge circuit is switched off, the inductor 110 releases energy to supply power for the output. Therefore, when the input voltage is higher and the duty ratio is lower, that is, when the switched-off time of the bridge circuit is longer, the inductor 110 is required to store more energy, which causes that both volume and loss of the inductor are larger. Therefore, the efficiency of the circuit and the volume of the energy storage elements can be optimal when the duty ratio is maximum, and correspondingly when the input voltage is minimum. However, the minimum input voltage such as 36V is normally not the rated operational voltage of the system, which causes that both efficiency and volume cannot be optimal when the system works at the rated operational voltage such as 48V.

Meanwhile, when the input voltage is higher, the switch devices 101~104 and 106~109 are all required to select devices with higher withstand voltage, but also required to select switch devices with higher current during the low-voltage input, therefore, it is difficult to optimize the selection of the switch devices. With regard to a common input voltage range 36~75V of the communication systems, the switch devices are required to select a margin at least twice the rated power, which also brings increased volume and loss.

Figure 2:
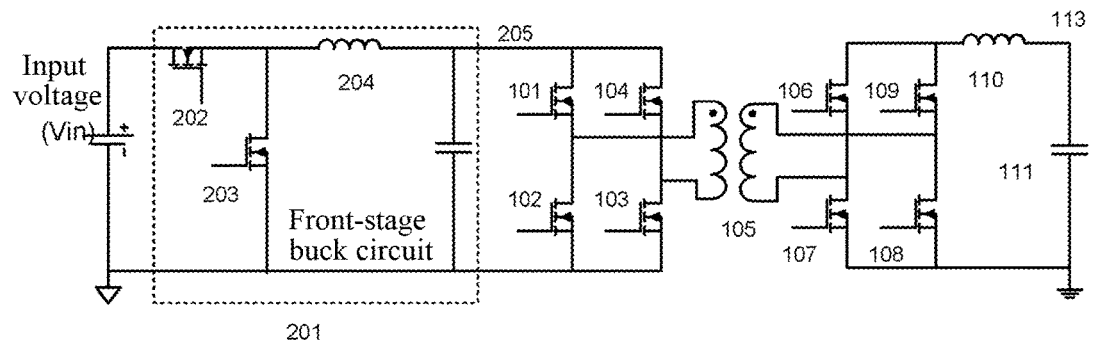
FIG. 2 is a schematic diagram of a structure of a two-stage power supply in the related art.

FIG. 2 is a two-stage structure of the circuit in the related art, the frequently used two-stage structure is to solve the problem of stress margin increase of the power device brought by the wide range of input voltage. FIG. 2 adds one stage of non-isolated front-stage voltage stabilizing circuit 201 based on the related art shown in FIG. 1. The output voltage 205 of 201 is a stable voltage, so that the post-stage traditional bridge buck isolated circuit is not required to bear a wider input voltage range. But the switch duty ratio of the front-stage 201 of the circuit is not improved, thus the problem of larger stress of the switch devices 202 and 203 and higher stored energy of the output inductor 204 still exists.

Figure 3:
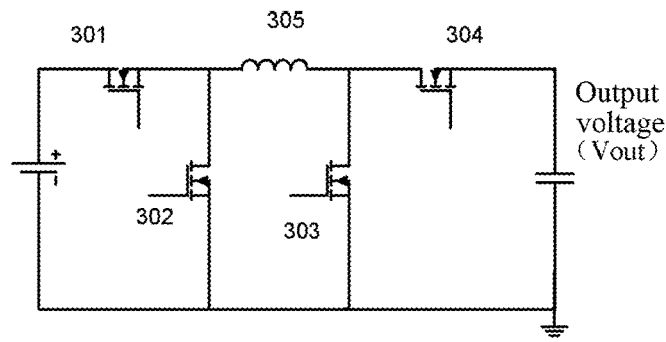
FIG. 3 is a schematic diagram of a structure of a non-isolated buck-boost circuit in the related art.

FIG. 3 is a non-isolated Buck-Boost circuit in the related art, which can implement a buck-boost function. In the circuit, the output voltage may be set as an intermediate value. When the input voltage $V_{in}$ is higher than the output voltage $V_{out}$, the switches 301 and 302 perform pulse width modulation, the circuit works in a Buck mode. When the input voltage $V_{in}$ is lower than the output voltage $V_{out}$, the switches 303 and 304 perform pulse width modulation, the circuit works in a Boost mode. Therefore, the duty ratio variation range may be halved, but the circuit does not have an isolation function.

Figure 4:
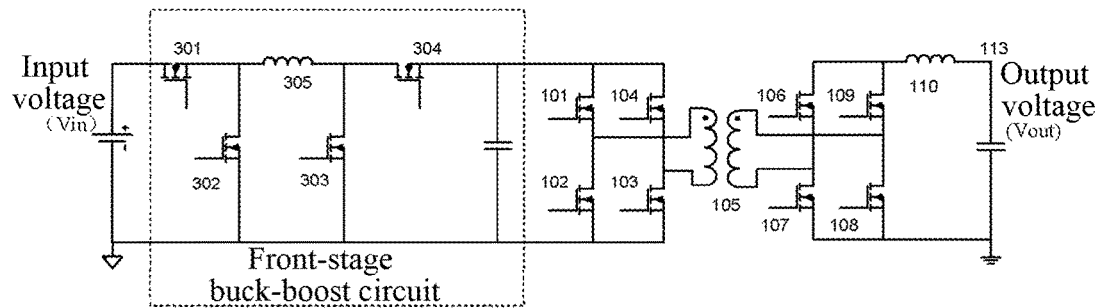
FIG. 4 is a schematic diagram of a structure of an isolated buck-boost circuit in the related art.

FIG. 4 is a Buck-Boost circuit added with an isolated circuit in the related art. A front-stage 401 thereof is the Buck-Boost circuit shown in FIG. 3, and an isolation part is the buck bridge isolated circuit as shown in FIG. 1. The circuit shown in FIG. 4 may achieve the advantage of narrow duty ratio variation range during the wide range of input through the front-stage non-isolated Buck-Boost circuit 401, and meanwhile, the post-stage isolated circuit is also not required to deal with the stress problem of the power device brought by the wide range of input voltage, which is an application with higher efficiency in the related art. But compared to the related art shown in FIG. 1, the circuit is required to increase, for example, four switch devices and one power inductor and one capacitor contained in 401, which leads to a larger volume increase and affects the efficiency and power density.

The embodiment 1 of the present document is as shown in FIG. 7. FIG. 1 is a schematic diagram of a structure of the power supply topology in the embodiment of the present document. Compared to the related art shown in FIG. 1, it is only required to increase two switches 501 and 502 to implement the buck-boost function and achieve the advantage of narrow duty ratio variation during the wide range of input, meanwhile, the post-stage circuit is also not required to deal with the wider input voltage range.

Figure 8:
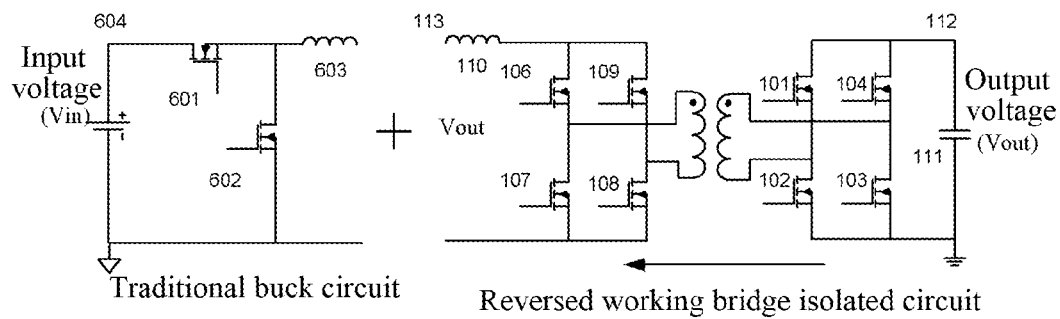
FIG. 8 is a schematic diagram of a working principle of the switching power supply according to the embodiment 1 in the preferred embodiments of the present document.

In order to further describe the structure and principle of the circuit diagram in FIG. 7, as shown in FIG. 8, it can be seen from FIG. 8 that the present document utilizes the synchronous rectification technology (that is, a characteristic that the output current thereof may flow bi-directionally when 106~109 are switch devices replaced with the diodes) in the secondary-side rectification circuit by using the buck bridge isolated circuit in the related art in FIG. 1, the input and output thereof are reversed and then connected to the front-stage Buck circuit, that is, the output inductor 110 thereof is connected to the output inductor 603 of the front-stage Buck, and the input power supply end 112 is connected to the output capacitor 111.

In the related art shown in FIG. 1, it is a buck structure from the end 112 to the end 113, through the reverse connection, in the structural diagram shown in FIG. 8, a boost structure from the end 113 to the end 112 may be formed, and in combination with a Buck voltage reducing circuit constituted by 601, 602 and 603, a buck-boost structure is formed. In the structure, the voltage stress of the primary side and secondary side switch devices 106~109 and 101~104 of the post-stage circuit is decided by the output voltage $V_{out}$, and the output voltage $V_{out}$ in most of applications is a stable value, thus the post-stage devices are also not required to deal with the problem of large stress brought by the wide range of input voltage. Moreover, the inductors 603 and 110 connected in series may be equivalently combined into one, thereby forming a simple invention structure as shown in FIG. 7.

Figure 9:
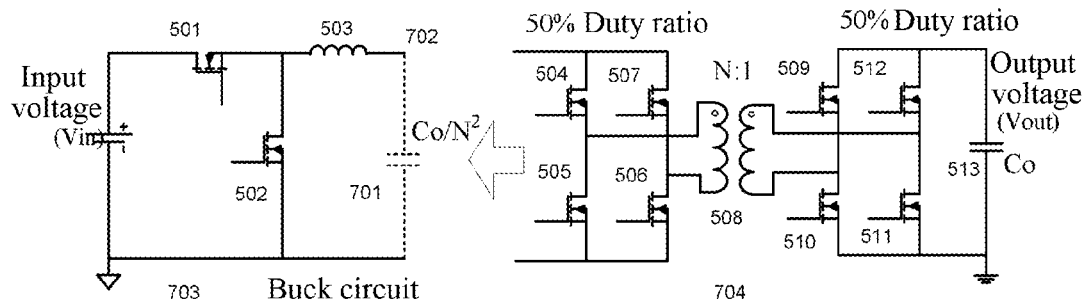
FIG. 9 is a schematic diagram of a buck function implementation principle of the switching power supply according to the embodiment 1 in the preferred embodiments of the present document.

In order to further describe the specific working implement of the present document, as shown in FIG. 9, when the structure of the embodiment of the present document shown in FIG. 7 works in a buck state, the switch devices 504~507 and 509~512 of the post-stage bridge isolated circuit work according to a duty ratio approximate to 50%, the post-stage isolated circuit 704 is equivalent to one switch direct-current transformer, the output capacitor 513 may be equivalently converted to the primary side according to the value of $C_O/N^2$. Herein, N is a turns ratio of the primary side winding and secondary side winding of the transformer 508, and $C_O$ is a capacitance value of the output capacitance 513 which is connected to an output end of the inductor 503. An equivalent capacitor 701 and the switch devices 501 and 502 and the output inductor 503 of the front-stage just form a whole Buck voltage reducing circuit 703. A value of the output voltage 702 thereof is $V_{in} \times D$, herein, D is a duty ratio of the switch device 501. Then 702 is turned into the output voltage $V_{out}$ according to the transformation ratio N:1 via the above-mentioned equivalent switch direct-current transformer 704, and thus the output voltage $V_{out}=V_{in}×D/N$, herein D<1. The buck function is implemented.

Figure 10:
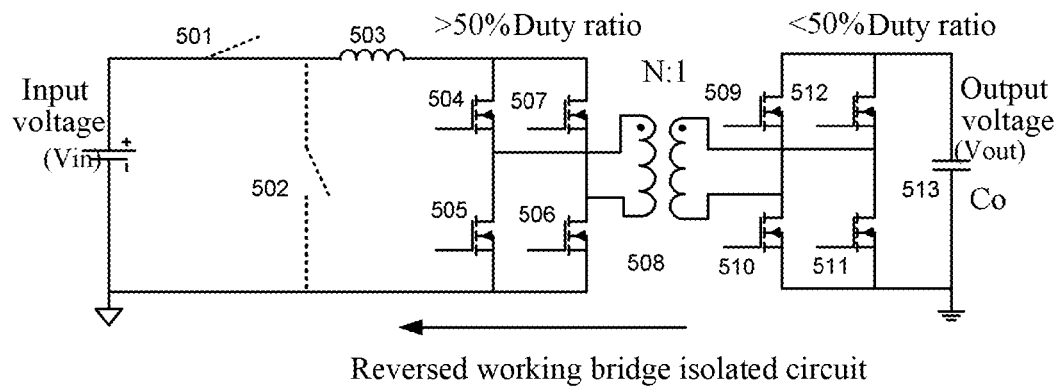
FIG. 10 is a schematic diagram of a boost function implementation principle of the switching power supply according to the embodiment 1 in the preferred embodiments of the present document.

As shown in FIG. 10, when the structure of the embodiment of the present document shown in FIG. 7 works in a boost state, the front-stage buck circuit works in a shoot-through state, that is, the switch 502 is switched off and the switch 501 is switched on, the inductor 503 is connected to the input power supply, and it is equivalent to the output inductor 110 of the buck bridge isolated circuit as shown in FIG. 1, and a reversely connected buck circuit is formed to implement a boost function. Specifically, the primary side switch devices 504~507 works according to the working mode of the switch devices 106~109 in the original synchronous rectification shown in FIG. 1, a duty ratio thereof is greater than 50%, that is, the 504~507 have a simultaneous switched-on time, when the 504~507 are simultaneously switched on, the inductor 503 charges through the input voltage $V_{in}$, at this point voltages of the primary side and secondary side windings of the transformer 508 are all 0, and the switch devices 509~512 are simultaneously switched off. When the 504~507 are diagonally and alternately switched on, that is, 504 and 506 are simultaneously switched on, or 505 and 507 are simultaneously switched on, the corresponding diagonal switch devices 510 and 512 of the secondary side are simultaneously switched on, or 509 and 511 are simultaneously switched on, the secondary-side winding of the transformer is connected to the output voltage $V_{out}$, and the primary-side winding voltage $V_{out}×N$ is connected to the output end of the inductor 503 to discharge the inductor. When the inductor current achieves a dynamic balance, $V_{out}=V_{in}/(2×(1-D))/N$, and the boost function is implemented, herein, D is a duty ratio of the switch devices 504~507, D>0.5.

Figure 11:
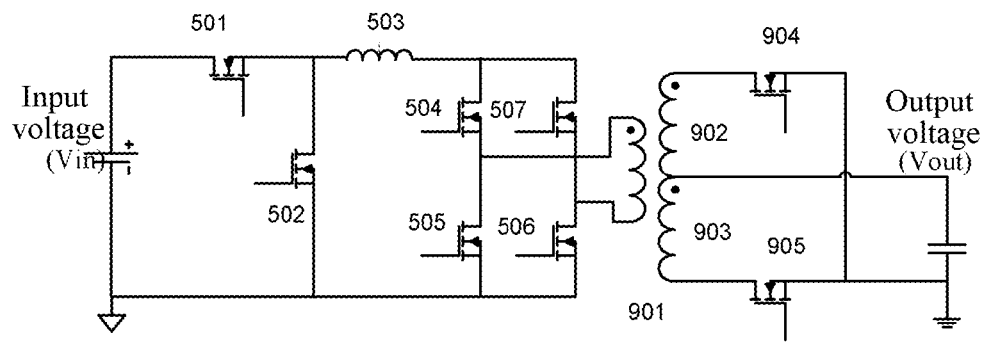
FIG. 11 is a schematic diagram of architecture of the switching power supply according to the embodiment 2 in the preferred embodiments of the present document.

The preferred embodiment 2 of the present document is as shown in FIG. 11. FIG. 11 is a structure diagram that the secondary side of the post-stage isolated circuit uses two switch devices and the secondary side of the transformer is two windings in the embodiment of the present document. The secondary side of the transformer 901 includes two windings 902 and 903, which corresponds to a reversed connection mode of the push-pull isolated buck circuit using the full-bridge rectification. Specifically, when the 504~507 are simultaneously switched on, the secondary-side switch devices 904 and 905 are switched off, and the inductor 503 charges through the input voltage $V_{in}$. When the 504~507 are diagonally and alternately switched on, that is, 504 and 506 are simultaneously switched on or 505 and 507 are simultaneously switched on, the secondary-side switch device 904 or 905 is correspondingly switched on, so that the winding 902 or 903 is connected to the output voltage $V_{out}$, and the voltage induced to the winding of the primary side of the transformer discharges the inductor 503.

Figure 12:
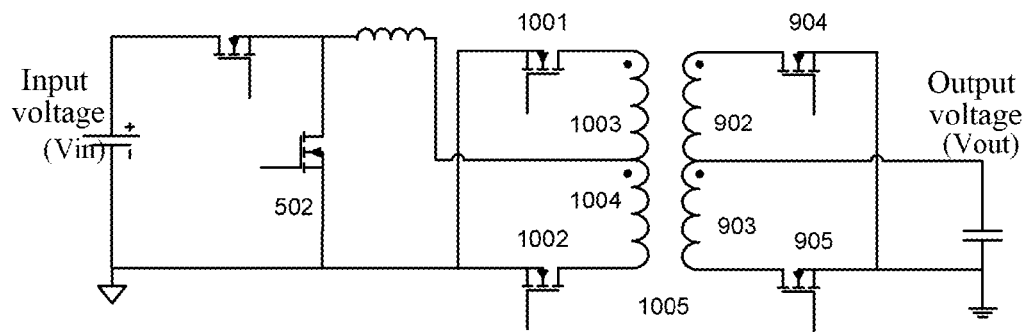
FIG. 12 is a schematic diagram of architecture of the switching power supply according to the embodiment 3 in the preferred embodiments of the present document.

The preferred embodiment 3 of the present document is as shown in FIG. 12. FIG. 12 is a structure diagram that the primary-side switch circuit of the post-stage isolated circuit uses two switch devices 1001 and 1002 in the present document. The primary side of the transformer 1005 further includes two windings 1003 and 1004, which corresponds to a reversed connection mode of the push-pull isolated buck circuit using the secondary-side duplex winding structure rectification. Specifically, when the primary-side switch devices 1001 and 1002 are simultaneously switched on, the secondary-side switch devices 904 and 905 are switched off, and the inductor 503 charges via the windings 1003 and 1004 and switch devices 1001 and 1002 through the input voltage $V_{in}$. When the 1001 and 1002 are alternately switched on, the secondary-side switch device 904 or 905 is correspondingly switched on, so that the winding 902 or 903 is connected to the output voltage $V_{out}$, and the voltage induced to the corresponding winding 1003 or 1004 of the primary side of the transformer discharges the inductor 503.

Figure 13:
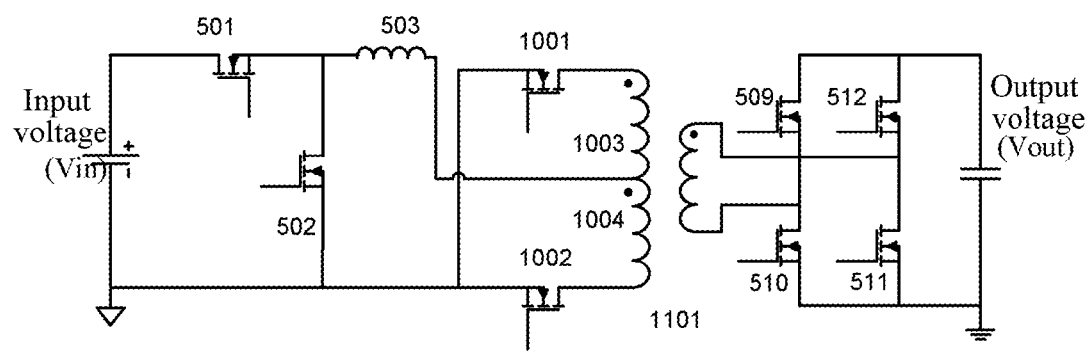
FIG. 13 is a schematic diagram of architecture of the switching power supply according to the embodiment 4 in the preferred embodiments of the present document.

The preferred embodiment 4 of the present document is as shown in FIG. 13. FIG. 13 is a structure that the primary-side switch circuit of the post-stage isolated circuit uses two switch devices and two windings as mentioned in FIG. 12 and the secondary side uses one winding and four switch devices as mentioned in FIG. 7, which corresponds to a reversed connection mode of the full-bridge isolated buck circuit using the secondary-side duplex winding structure rectification. Specifically, when the primary-side switch devices 1001 and 1002 are simultaneously switched on, the secondary-side switch devices 509~512 are all switched off, and the inductor 503 charges via the windings 1003 and 1004 and switch devices 1001 and 1002 through the input voltage $V_{in}$. When the 1001 and 1002 are alternately switched on, the corresponding diagonal switch devices 509 and 511 of the secondary side are simultaneously switched on or 510 and 512 are simultaneously switched on, the winding of the secondary side of the transformer is connected to the output voltage $V_{out}$, and the voltage induced to the corresponding winding 1003 or 1004 of the primary side of the transformer discharges the inductor 503.

Figure 14:
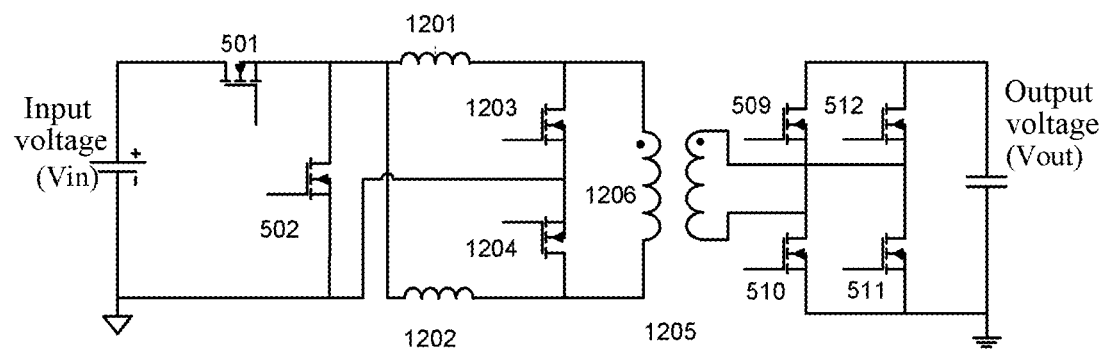
FIG. 14 is a schematic diagram of architecture of the switching power supply according to the embodiment 5 in the preferred embodiments of the present document.

The preferred embodiment 5 of the present document is as shown in FIG. 14. FIG. 14 is a structure diagram that the primary side uses two primary-side inductors in the embodiment of the present document, which corresponds to a reversed connection mode of the full-bridge isolated buck circuit using the secondary-side current-double rectification. Specifically, when the primary-side switch devices 1203 and 1204 are simultaneously switched on, the secondary-side switch devices 509~512 are all switched off, and the inductors 1201 and 1202 charges via the switch devices 1203 and 1204 through the input voltage $V_{in}$. When the switch 1203 is switched off and the 1204 continues to be switched on, the inductor 1202 continues to charge through the $V_{in}$, the secondary-side switch devices 510 and 512 are switched on, the output voltage $V_{out}$ is connected to the winding of the secondary side of the transformer, and the voltage induced to the primary-side winding 1206 discharges the inductor 1201. When the switch 1204 is switched off and the 1203 continues to be switched on, the inductor 1201 continues to charge through the $V_{in}$, the secondary-side switch devices 509 and 511 are switched on, the output voltage $V_{out}$ is negatively connected to the winding of the secondary side of the transformer, and the voltage induced to the primary-side winding 1206 discharges the inductor 1202.

It can be seen from the above embodiments of the present document that the switching power supply provided in the preferred embodiments of the present document charges the first inductor by controlling switch-on of the switch devices of the primary-side switch circuit, when the switch devices of the primary-side switch circuit are not simultaneously switched on, by controlling the switch devices of secondary-side rectification circuit, the output voltage is connected to the secondary-side winding of the transformer, and the voltage induced to the primary-side winding discharges the first inductor.

Though the preferred embodiments of the present document have been disclosed for the purpose of illustration, the people skilled in the art will recognize that various improvements, additions and replacements are also possible, therefore, the scope of the present document should not be limited to the above embodiments.

INDUSTRIAL APPLICABILITY

The structure of the front-stage circuit of the embodiment of the present document is simple, both the buck-boost circuit and the isolated circuit are designed in the switching power supply, and the number of circuit stages of the switching power supply jointly formed with the post-stage isolated circuit is smaller, thus the volume is smaller, which solves the problem of wide duty ratio variation range and low efficiency or many power devices and lager volume brought as the post-stage bridge circuit only plays a role of isolation or buck in the related art.

What is claimed is:

1. A switching power supply, comprising:
an input power supply, a front-stage circuit and a post-stage isolated circuit; wherein,
the front-stage circuit comprises: a first inductor and at least two switch devices—a first switch device and a second switch device; and
the post-stage isolated circuit comprises: a primary-side switch circuit, a transformer and a secondary-side rectification circuit;
wherein, one end of the first switch device is connected to a positive electrode of the input power supply, one end of the second switch device and an input end of the first inductor are jointly connected to another end of the first switch device, another end of the second switch device is connected to a negative electrode of the input power supply, an output end of the first inductor is connected to the primary-side switch circuit of the post-stage isolated circuit, and another end of the primary-side switch circuit is connected to another end of the second switch device,
wherein the primary-side switch circuit comprises at least two switch devices, wherein, switched-on of one switch device or switched-on of a combination switch containing the one switch device makes the first inductor connected to a charging state, switched-off of another switch device or switched-off of a combination switch containing the another switch device makes energy in the first inductor transferred to the secondary-side rectification circuit via the transformer;
the secondary-side rectification circuit comprises at least two switch devices used for performing rectification on the energy transferred by the primary-side switch circuit to form an output voltage of the switching power supply.

2. The switching power supply of claim 1, wherein, said switched-on of one switch device or switched-on of a combination switch containing the one switch device makes the first inductor connected to a charging state, in order to connect the output end of the first inductor to a negative end of the input power supply, or connect the output end of the first inductor to the negative end of the input power supply through a primary-side winding.

3. The switching power supply of claim 1, wherein, in a case that a transformer primary side comprises one winding, and the primary-side switch circuit comprises four switch devices—a third switch device, a fourth switch device, a fifth switch device and a sixth switch device,
one end of the third switch device is connected to the output end of the first inductor, another end of the third switch device is connected to the fourth switch device and a current inflow end of the transformer primary side, another end of the fourth switch device and one end of the fifth switch device and the negative electrode of the input power supply are connected jointly together, another end of the fifth switch device and one end of the sixth switch device and a current outflow end of the transformer primary side are connected jointly together, and another end of the sixth switch device is connected to the output end of the first inductor.

4. The switching power supply of claim 1, wherein, in a case that a transformer primary side comprises one winding, and the primary-side switch circuit comprises two switch devices—a third switch device and a fourth switch device and a second inductor,
one end of the third switch device is connected to the output end of the first inductor, another end of the third switch device is connected to the output end of the first inductor via the fourth switch device and the second inductor, a junction of the third switch device and the fourth switch device is connected to the negative electrode of the input power supply; the output end of the first inductor is connected to a current inflow end of the transformer primary side, and a current outflow end of the transformer primary side is connected to a junction of the second inductor and the fourth switch device.

5. The switching power supply of claim 1, wherein, in a case that a transformer primary side comprises two windings, and the primary-side switch circuit comprises two switch devices—a third switch device and a fourth switch device,
one end of the third switch device is connected to a current inflow end of a first winding of the transformer primary side, one end of the fourth switch device is connected to a current outflow end of a second winding of the transformer primary side, a current outflow end of the first winding and a current inflow end of the second winding are jointly connected to the output end of the first inductor, and another end of the third switch device and another end of the fourth switch device are jointly connected to the negative end of the input power supply.

6. The switching power supply of claim 1, wherein, in a case that a transformer secondary side comprises one winding, and the secondary-side rectification circuit comprises four switch devices—a seventh switch device, an eighth switch device, a ninth switch device and a tenth switch device,
a dotted end of the transformer secondary side corresponding to the current inflow end of the transformer primary side and one end of the seventh switch device and one end of the eighth switch device are connected jointly together, another end of the seventh switch device is connected to another end of the eighth switch device via the ninth switch device and the tenth switch device, a junction of the ninth switch device and the tenth switch device is jointly connected to another end of the dotted end of the transformer secondary side, and another end of the seventh switch device and another end of the eighth switch device serve as an output end of the secondary-side rectification circuit.

7. The switching power supply of claim 1, wherein, in a case that a transformer secondary side comprises two windings, and the secondary-side rectification circuit comprises two switch devices—a seventh switch device and an eighth switch device,
one end of the seventh switch device is connected to a current inflow end of a first winding of the transformer secondary side, one end of the eighth switch device is connected to a current outflow end of a second winding of the transformer secondary side, a current outflow end of the first winding and a current inflow end of the second winding jointly serve as one output end of the secondary-side rectification circuit, another end of the seventh switch device and another end of the eighth switch device are connected and jointly serve as another output end of the secondary-side rectification circuit, so that the one output end of the secondary-side rectification circuit and the another output end form an output end of the secondary-side rectification circuit.

8. The switching power supply of claim 1, wherein, the switch devices at least comprise one of the following: a triode, an MOS transistor and a diode.

9. A method for controlling a switching power supply, used for controlling a switching power supply comprising an input power supply, a front-stage circuit and a post-stage isolated circuit, wherein, the front-stage circuit comprises: a first inductor and at least two switch devices—a first switch device and a second switch device; and the post-stage isolated circuit comprises: a primary-side switch circuit, a transformer and a secondary-side rectification circuit;

wherein, one end of the first switch device is connected to a positive electrode of the input power supply, one end of the second switch device and an input end of the first inductor are jointly connected to another end of the first switch device, another end of the second switch device is connected to a negative electrode of the input power supply, an output end of the first inductor is connected to the primary-side switch circuit of the post-stage isolated circuit, and another end of the primary-side switch circuit is connected to another end of the second switch device;

the method comprises:

in a case of supplying an input voltage, controlling switch devices of the primary-side switch circuit, so that switched-on of a combination of at least one switch device makes the first inductor connected to the charging state, and switched-off of a combination of at least one switch device makes energy in the first inductor transferred to the secondary-side rectification circuit via the transformer; and the secondary-side rectification circuit performing rectification on the energy transferred by the primary-side switch circuit to form the output voltage of the switching power supply.

10. The method of claim 9, wherein, when the switch circuit works in a boost state, the front-stage circuit works in a shoot-through state to implement a boost function; and when the switch circuit works in a buck state, the post-stage isolated circuit works in the shoot-through state to implement a buck function.

\* \* \* \* \*